(12) United States Patent
Klimack

(10) Patent No.: US 9,637,983 B2
(45) Date of Patent: May 2, 2017

(54) CASING CONNECTION

(71) Applicant: KLIMACK HOLDINGS INC., Tofield (CA)

(72) Inventor: Brian K. Klimack, Tofield (CA)

(73) Assignee: Klimack Holdings Inc., Tofield (CA)

( * ) Notice: Subject to any disclaimer, the term of this patent is extended or adjusted under 35 U.S.C. 154(b) by 0 days.

(21) Appl. No.: 14/069,592

(22) Filed: Nov. 1, 2013

(65) Prior Publication Data

US 2014/0319831 A1 Oct. 30, 2014

Related U.S. Application Data

(63) Continuation-in-part of application No. 13/304,533, filed on Nov. 25, 2011, now abandoned.

(51) Int. Cl.
*F16L 27/047* (2006.01)
*E21B 17/08* (2006.01)
*F16L 27/08* (2006.01)

(52) U.S. Cl.
CPC ............ *E21B 17/08* (2013.01); *F16L 27/047* (2013.01); *F16L 27/0816* (2013.01)

(58) Field of Classification Search
CPC .. F16L 27/0816; F16L 27/0474; F16L 27/047
USPC .......... 285/913, 354, 261, 280, 281
See application file for complete search history.

(56) References Cited

U.S. PATENT DOCUMENTS

| | | | | |
|---|---|---|---|---|
| 2,438,529 A * | 3/1948 | Woodling | ............... | 285/281 |
| 2,477,677 A * | 8/1949 | Woodling | ............... | 285/281 |
| 3,236,544 A * | 2/1966 | Brown | ............... | 285/97 |
| 3,454,288 A * | 7/1969 | Mancusi, Jr. | ............... | 285/98 |
| 3,712,645 A * | 1/1973 | Herter | ............... | 285/95 |
| 4,672,998 A * | 6/1987 | Kozak, III | ............... | 137/614.04 |
| 4,733,442 A * | 3/1988 | Asai | ............... | 24/580.1 |
| 5,048,873 A * | 9/1991 | Allread et al. | ............... | 285/261 |
| 2009/0200798 A1* | 8/2009 | Hamamoto et al. | ............... | 285/334 |

FOREIGN PATENT DOCUMENTS

DE 3812211 A1 * 11/1989 ............ E03B 3/12

* cited by examiner

*Primary Examiner* — David E Sosnowski
*Assistant Examiner* — James Linford
(74) *Attorney, Agent, or Firm* — Field LLP

(57) ABSTRACT

A casing connection is provided having a first sub with a first circular radius face and a second circular radius face. A second sub is provided having a third circular radius face and a threaded profile on at least a portion of an outside surface of the second sub. An adjusting collar is further provided having a fourth circular radius face and a threaded profile on at least a portion of an inner surface of the adjusting collar. Sealing surfaces are formed at connections between the first circular radius face and the fourth circular radius face, the second circular radius face and the third circular radius face and the second sub threaded portion and the adjusting collar threaded portion. Bendability and rotatability of the casing connection is adjustable by tightening or loosening said threaded connection between said second sub and said adjustable collar.

11 Claims, 4 Drawing Sheets

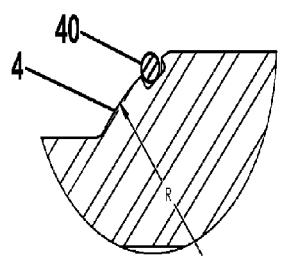
Figure 1-A
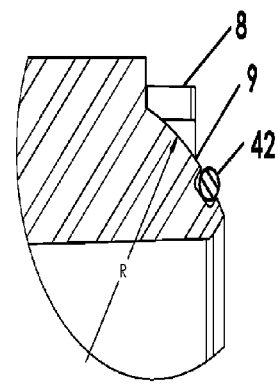
Figure 1-B
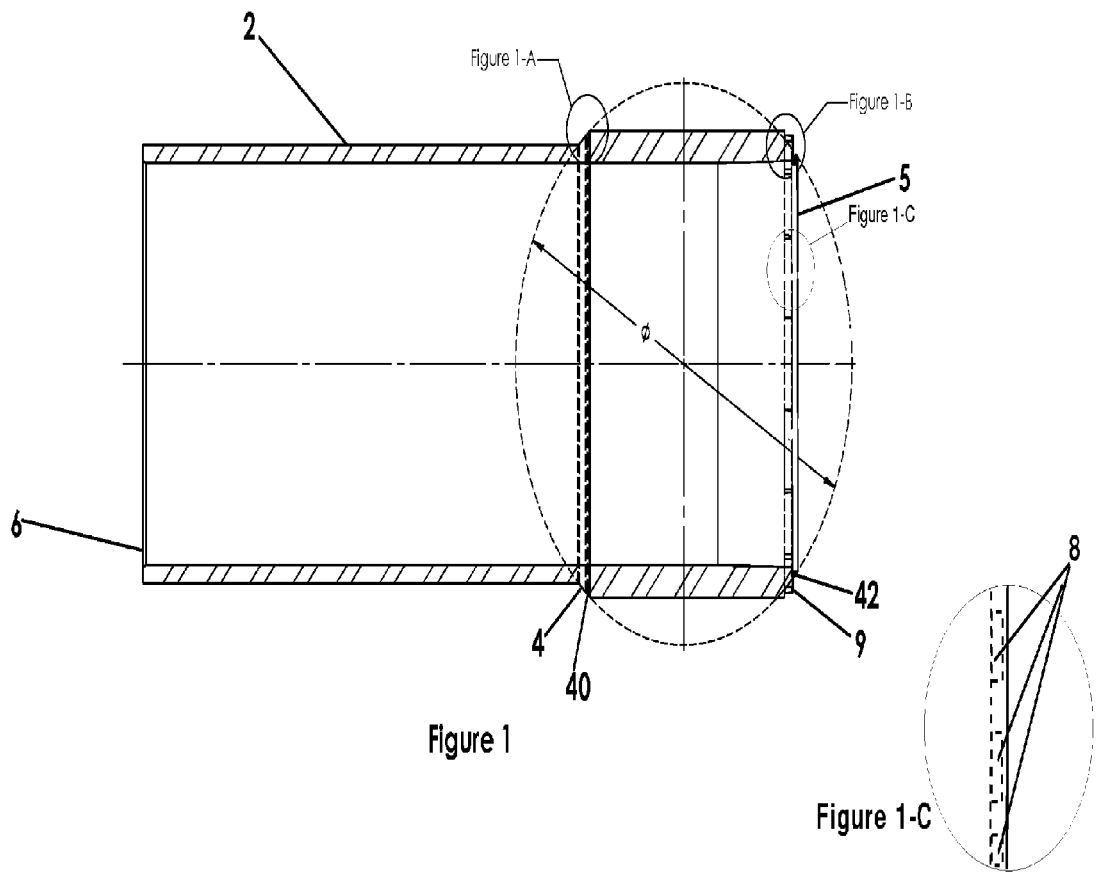
Figure 1
Figure 1-C

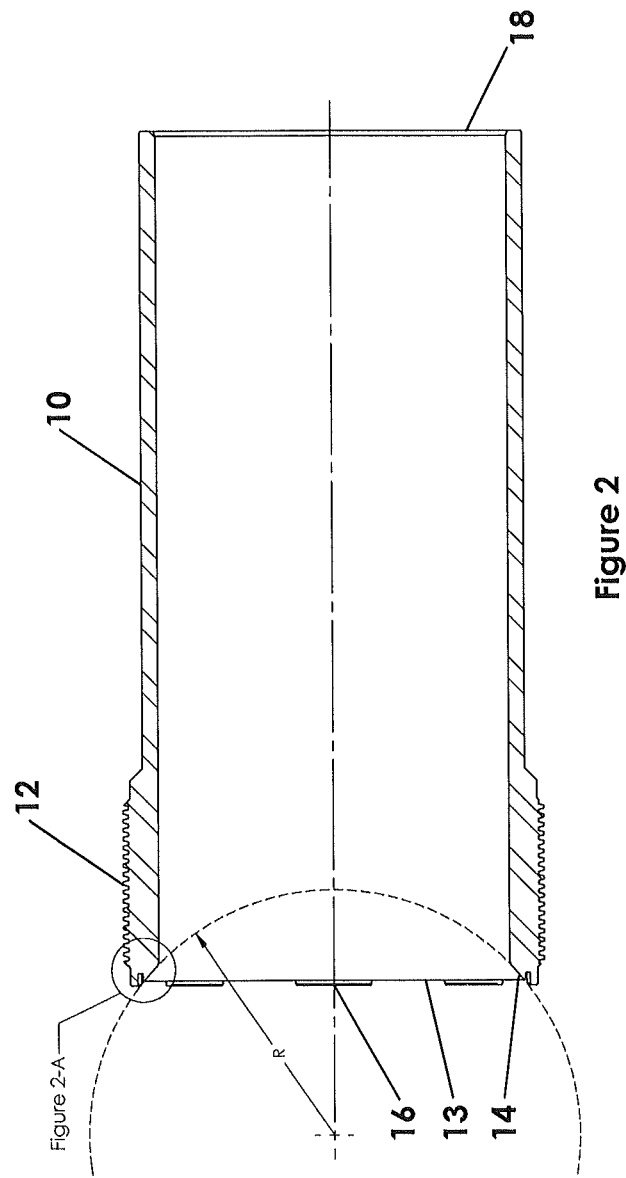
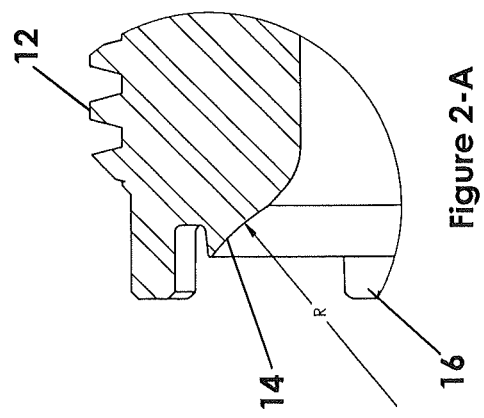

Figure 3-A

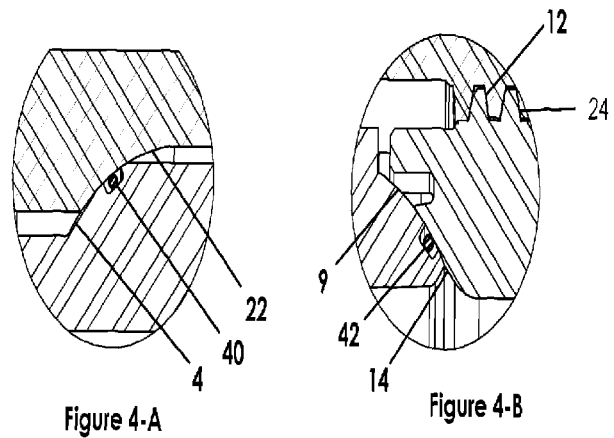
Figure 4-A    Figure 4-B
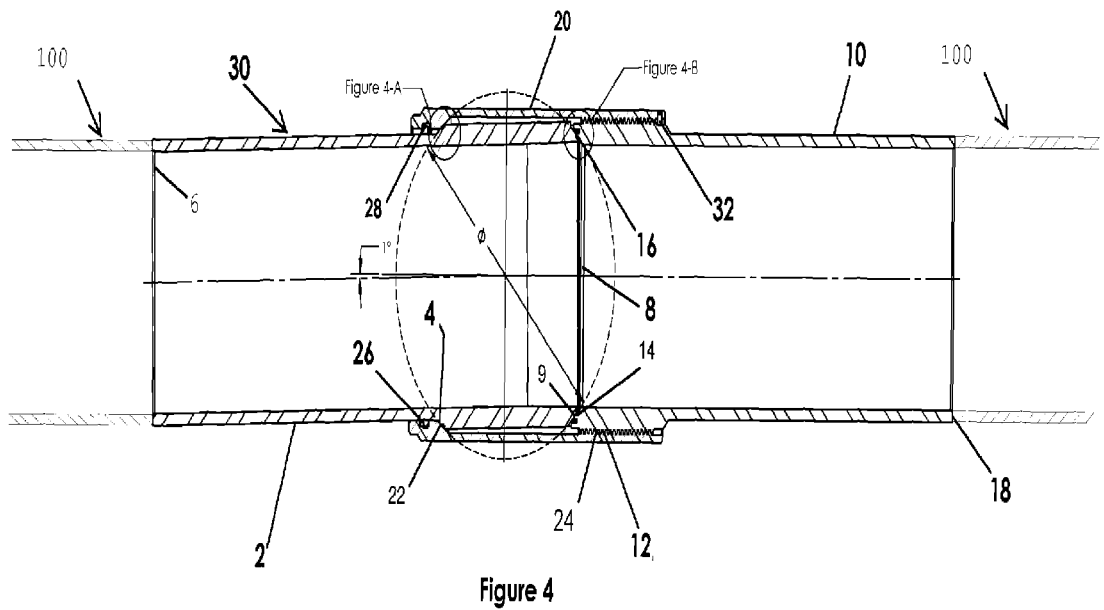
Figure 4

US 9,637,983 B2

CASING CONNECTION

TECHNICAL FIELD

The present invention relates to a rotatable and bendable casing connection for use in downhole wellbores.

BACKGROUND OF THE INVENTION

In oil and gas wells where the casing is subject to movement down hole, failures can occur in the casing or in the casing connection. The movement of the casing can be caused by many factors such as shifting formations, formation pressures, overburden pressures, and thermal expansion and contraction from steam injection operations. Stresses induced to the casing from factors such as these, can buckle the casing wall, or cause connections to part or leak.

Horizontal well drilling is increasingly becoming a popular method of producing oil and gas from formations. Some of these horizontal wells have a shallow vertical depth, and require large degree build angles to hit the target. While existing casing connections can be designed to handle predicted changes in trajectory as the wellbore shifts from the vertical section to horizontal, such as for example bends 7° or less, unexpected doglegs may present larger build angles, as high as 30°, that are harder accommodate without failure or leaking.

Doglegs are defined as particularly crooked places in a wellbore where the trajectory of the wellbore changes more rapidly than anticipated or desired. A dogleg is typically described in terms of the number of degrees of trajectory change per 100 feet/30 meters. Doglegs often occur when characteristics of the formation do not allow for or support drilling at the desired build angle to create the horizontal wellbore. In such cases, large degree bends may be necessary to return drilling trajectory to the desired angle. Such large degree bends are often not tolerable by existing casing connections.

When there is a casing failure in a well bore, often, the well is lost. When running a rigid casing string through a build section of a horizontal well, often the casing is unable to pass through, or casing connections are damaged due to bending.

All casing connections can withstand bending to some degree, but in most cases, the connection will leak or part when bent. Most connections rely on the threads to deliver a seal, as well as the torque and tensile strength of the connection. Once the thread has a bending load applied to it, the integrity of the connection is drastically reduced or lost completely.

In designing casing connections a number of sizing requirements must be met that also pose a challenge to providing flexibility. Firstly, the annular allowance between a drilled wellbore and the casing to be installed the wellbore is very small, often in the order of ½" to ¾". This means that the outer diameter (OD) of any casing connection must match as closely as possible the OD of the casing to be connected. Similarly, there is a need to maintain a minimum inside diameter (ID) of the casing connection that matches as closely as possible the ID of the casing to be connected, so that tools maybe deployed in the casing without the formation of bottlenecks. Furthermore, casing connections must meet wellbore equipment minimum strength and durability requirements, while still being able to provide flexibility.

It is therefore desirable to develop a casing connection that can allow bending and rotation of the casing during installation and operation. It is further desirable to provide flexibility to standard, stiff casing so that it can be deployed in more severe doglegs, or bends, without departing greatly from ID, OD and strength requirements of the casing sections to be connected.

SUMMARY OF INVENTION

A casing connection is provided. The casing connection comprises a first sub comprising a first circular radius face; and a second circular radius face. A second sub is provided comprising a third circular radius face for mating with the second circular radius face of the first sub and a threaded profile on at least a portion of an outside surface of the second sub. An adjusting collar is provided comprising a fourth circular radius face for mating with the first circular radius face of the first sub and a threaded profile on at least a portion of an inner surface of the adjusting collar for threadably connecting to the threaded profile of said second sub. Sealing surfaces are formed at connections between the first circular radius face and the fourth circular radius face; between the second circular radius face and the third circular radius face; and between the second sub threaded portion and the adjusting collar threaded portion and wherein bendability and rotatability of the casing connection is adjustable by tightening or loosening said threaded connection between said second sub and said adjustable collar.

BRIEF DESCRIPTION OF THE DRAWINGS

The present invention will now be described in greater detail, with reference to the following drawings, in which:

FIG. 1 depicts one embodiment of a first sub portion of the present casing connection;

FIG. 1-A depicts a detailed view of a portion of FIG. 1;

FIG. 1-B depicts a detailed view of a portion of FIG. 1;

FIG. 1-C depicts a detailed view of a portion of FIG. 1;

FIG. 2 depicts one embodiment of a second sub portion of the present casing connection;

FIG. 2-A depicts a detailed view of a portion of FIG. 2;

FIG. 3-A depicts a detailed view of a portion of FIG. 3;

FIG. 4 depicts one embodiment an assembled casing connection of the present invention;

FIG. 4-A depicts a detailed view of a portion of FIG. 4; and

FIG. 4-B depicts a detailed view of a portion of Figure B.

DETAILED DESCRIPTION OF THE INVENTION

Figure 3:
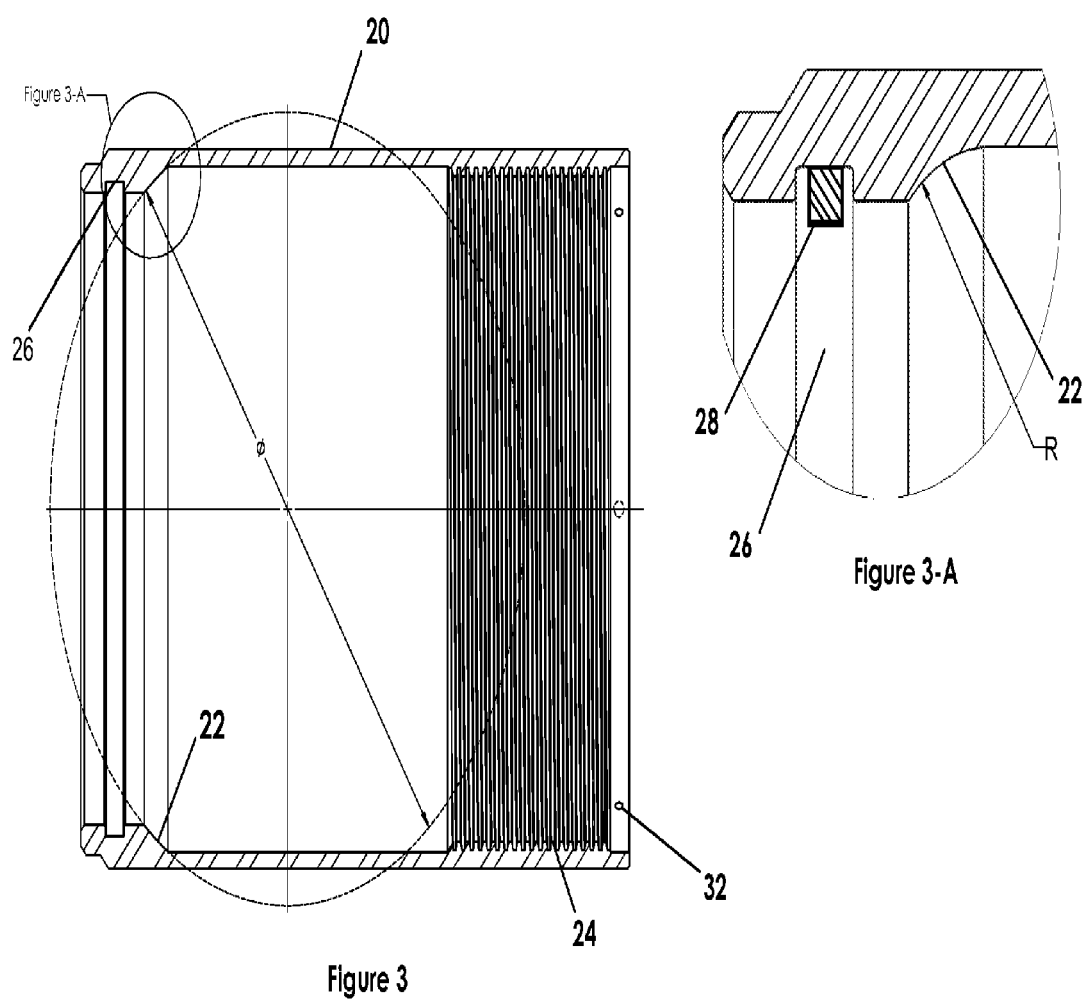
FIG. 3 depicts one embodiment of a threaded coupling for use in the present casing connection.

The present invention provides a casing connection that can allow bending and also bending under rotation. The present casing connection advantageously can be built in a manner that it equals or exceeds the standard connection specifications, so that it can either replace standard connections or work in conjunction with them.

The present casing connection consists of three major components: a first sub, a second sub and an adjusting collar.

A preferred embodiment of the first sub 2 is depicted in FIG. 1. The first sub 2 includes a bored-through inside diameter that is preferably consistent with the nominal inside diameter of the casing that it will be used with. An outer surface of the first sub 2 includes a first circular radius face 4 to mate with an internal face of the adjusting collar. The first sub 2 further has a first end 6 which can be preferably machined, welded or threaded to match the casing that it will be run with. Most preferably, the first end 6 is threaded. A second end 5 of the first sub 2 is provided with a second circular radius face 9 that mates with the second sub. As depicted in FIG. 1, the curvatures of the first circular radius face 4 and the second circular radius face 9 on the first sub 2 define a circle, the diameter of which is related to the outside diameter of the first sub 2 and the relative spacing of the first and second circular radius faces 4,9.

With reference to detail FIGS. 1-A and 1-B, the curvature of the first and second circular radius faces 4,9 can be seen. This curvature allows for bending and rotation of the present casing connection, unlike straight beveled edges. The radius of curvature of the first and second circular radius faces depends on such factors as the nominal diameter of the casing string, and by extension the nominal diameter of the assembled casing connection. Smaller diameter casing connections will have smaller radii of curvature while larger bore casing connections will have larger radii of curvature. Generally the radius of curvature is equal to or greater than the diameter of the present casing connection. Preferably, the range of radius of curvature can be from 2.5" up to 15".

With reference to FIG. 1-C, preferably, one or more torque preventing means are also provided on the second end 5, more preferably in the form of milled torque cogs 8 along the second end of the first sub.

A preferred embodiment of the second sub 10 is depicted in FIG. 2. The second sub 10 includes a bored-through inside diameter to match the nominal inside diameter of the casing that will be used with it. An outside surface of the second sub 10 preferably comprises a threaded portion 12 to mate to and thread into the adjusting collar. A first end 13 of the second sub 10 further comprises a third circular radius face 14. As depicted in FIG. 2, the radius curvature of the third circular radius face 14 defines the same circle as that defined by first and second circular radius faces 4,9 of the first sub 2.

With reference to detail FIG. 2-A, the curvature of the third circular radius face 14 can be seen. This curvature allows for bending and rotation of the present casing connection, unlike straight beveled profiles.

The first end 13 of the second sub 10 also preferably comprises one or more torque preventing means, more preferably in the form of torque cogs 16 milled to an exterior surface of the third circular radius face 14.

When the bottom sub face 10 is connected with the first sub 2, the second circular radius face 9 mates with the third circular radius face 14 and torque cogs 8 mate with torque cogs 16 such that the sets of torque cogs 8, 16 interlock. The second sub 10 further has a second end 18. The second end 18 can be preferably machined, welded or threaded to match the casing that it will be run with. Most preferably, the second end 18 is threaded.

One embodiment of the adjusting collar 20 of the present invention is depicted in FIG. 3. The adjusting collar 20 has a bore through inside diameter in which a first collar portion of the inside diameter is larger than an outside diameter of the first end 6 of the first sub 2.

A second collar portion of the inside diameter of the adjusting collar 20 preferably consists of a machined fourth circular radius face 22, as seen in detailed FIG. 3-A. The fourth circular radius face has the same radius of curvature as and mates with the first circular radius face 4 of the first sub 2, when the components are assembled.

A third collar portion of the inside diameter of the adjusting collar includes a threaded connection 24, which mates to the threaded portion 12 of the second sub 10. In a preferred embodiment the threaded connection 24 of the adjusting collar 20 is a female threaded connection and the threaded portion 12 of the second sub 10 is a male threaded connection.

The outside diameter of the adjusting collar 20 is preferably similar to that of the casing being used. This advantageously means that the present casing connection requires no extra annular allowance between the casing string and drilled wellbore that the casing is run in.

The adjusting collar 20 can optionally contain one or more set screws 32 to secure against any additional movement or to further secure the present casing connection after initial makeup.

With reference to FIG. 3-A, a dust seal groove 28 and sealing ring 26 is preferably provided in the first collar portion of the adjusting collar 20. More preferably, the sealing ring 26 is a square profile ring, although round or other profiled sealing rings 26 are also suitable and would be understood by a person of skill in the art to be encompassed by the scope of the present invention. Further preferably the dust seal groove 28 allows for subtle movement of the sealing ring 26, to accommodate the bending and rotation of the assembled casing connection.

When the casing connection is assembled, the sealing ring 28 serves to seal the adjusting collar 20 to the first sub 2 in a region proximal the first and fourth circular radius faces 4, 22, to prevent sand from entering and potentially wearing out the casing connection.

The present casing connection can be assembled prior to being run in downhole along with the casings. One embodiment of the assembled casing connection 30 of the present invention is depicted in FIG. 4. To assemble the casing connection 30, the adjusting collar 20 is first slid over the first end 6 portion of the first sub 2. The first sub 2 is then positioned with the second sub 10, such that their mating circular radius faces 9, 14 and torque cogs 8, 16 mate with one another. The adjusting collar 20 is then advanced until the threaded connection 24 of the adjusting collar 20 contacts with the thread portion 12 of the second sub 10.

The adjusting collar 20 is then rotated to engage the threaded connection 24 with the threaded portion 12 of the second sub 10. The rotation acts to tighten the adjusting collar 20 until the fourth circular radius face 22 of the adjusting collar 20 mates to the first circular face 4 of the first sub 2. The radius of curvature of the circular radius faces 4, 9, 14 and 22 also depends on the length of the threaded connection 24 and the threaded portion 12 and the thread strength imparted by tightening of these sections of the casing connection.

In a preferred embodiment, O-rings 40, 42 can optionally be inserted between each pair of circular radius faces 4, 22 and 9, 14 to provide additional sealing. In such case, the radius of curvature of the circular radius faces 4, 9, 14 and 22, is preferably optimized to achieve a desired degree of bend while also ensuring that mating circular radius faces 4, 22 and 9, 14 maintain engagement with O-rings 40, 42 to maintain an optimized seal.

The amount of torque applied to the threaded connections 12, 24 will determine the amount of force required to bend or rotate the top and second subs 2, 10 away from each other along their mating circular radius faces 9, 14 and 4, 22. The amount of force required can be predetermined and set before running the casing connection 30 downhole, by the extent of tightening applied to the threaded connections 12, 24. The one or more torque preventing means, preferably in the form of mating torque cogs 8, 16 act to prevent over-torque or unscrewing of the casing connection 30 during rotation and bending downhole. Optionally, any number of known means in the art can be additionally used to prevent against over-torque, or loosening of the connections, including but not limited to set screws or spot welds.

The present casing connection 30 provides three separate sealing areas. The first sealing area consists of the seal created by the mating of first and fourth circular radius faces 4, 22 of the tope face sub 2 and the adjusting collar 20. The second sealing area consists of the seal created by the second and third circular radius faces 9, 14 of the first sub 2 and second sub 10. Finally, the third sealing area consists of the seal created by the adjusting collar 20 and second sub 10 threaded connections 12, 24.

The adjusting collar 20 of present casing connection 30 forms a coupling-style joint that advantageously provides an incrementally larger outside diameter than flush joints commonly used in the art, leading to greater strength and better sealing.

In the present casing connection 30, a leak path from well annulus to casing interior or vice versa can only develop if two of the three sealing areas fail. This is unlike typical casing connections, in which the singular sealing area is formed by the threaded connections between the casings and casing connection. In such cases, bending of the threaded connection most commonly contributes to the formation of a leak path.

In the present invention seal, torque and compressive or bending strengths are provided by mating circular radius faces 9,14 and 4,22, while threads 12, 24 is used only to control maximum tensile loading.

While O-rings 28, 40 and 42 may enhance sealing of the present casing connection, they are not required to ensure a proper seal. Since the sealing surfaces are formed by the mating of metal to metal surfaces, and more preferably steel surfaces, they can advantageously withstand extreme temperatures and pressures.

After the present casing connection 30 is assembled, it is connected to the casing 100 to be run into the wellbore. When casing 100 sections, connected by the present connections 30, are run into the downhole well and encounter doglegs, the present casing connections 30 allow bending by virtue of the curvature provided by mating circular radius faces 4, 22 and 9, 14. This allows the casing string to better conform to the direction of doglegs in the well.

For example, the present casing connection 30 can allow standard casing to be deployed in bends of up to 30° versus a typical 7° dogleg limit. This allows casing to be run through shallow vertical depths, without the aid of slant drilling rigs.

The present connection 30 can optionally be assembled directly onto plain end casings, by welding and other known means, or it can be assembled to existing threaded casings and specifically placed throughout the casing string as required.

When a well is drilled, the location and degree of bending of each dogleg is known from the drilling information. Accordingly, the present casing connection can be set along a length of casing to align with the downhole doglegs, when the casing is in its final resting position or depth.

If casing string has to be rotated through these bends, the present casing connection 30 can be rotated at the same time it is bending to conform to the wellbore. If the depths or location of the doglegs are predetermined, the present casing connections 30 can be positioned at predetermined lengths along the casing string that correspond with the depths or locations of the doglegs. This reduces the amount of stress on the casing lengths themselves after the casing has been installed.

In wells where thermal expansion and contraction is evident, the present casing connection 30 can absorb some of these thermal loads which would otherwise be placed on the threaded portion of typical connections. Most thermal movement observed in the casing is located in the open hole sections of the wells, where casing is allowed to move most freely. In many of these open holes, sand production, fluid production, and formation movements are evident. As voids are created from displaced solids and fluids, formations will shift and create unwanted casing movement.

The movement of a casing within the open hole also affects the forces acting on the casing liner hangers. Most wells will produce closer to the heel of the well than at its toe. Most formation movements are noticed at the heel as well. The increased movement of the casing at the heel area tends to offset the position of the casing liner hanger relative to the cemented intermediate casing by causing a bending load. This typically results in a failure to the seal. By placing the present casing connection 30 directly after the liner hanger and through the heel area, bending movements are absorbed, placing less stress on the casing liner hanger and the casing connections in the heel area.

In thermal wells where the intermediate casing is cemented to the surface, undesirable loads on the casing have also been observed. In cemented wells, the casing is acted upon by the stresses of thermal expansion and contraction, but is prevented from movement by the cement bond. Since the intermediate casing typically runs through the build section of the well, any casing connections used in this section are already under the strain of bending through the build section and thermal expansion or contraction adds to this stress. The result is often connection seal failures and casing collapse. By placing the present casing connections 30 in predetermined areas of the cemented intermediate casing, bending is allowed and stresses from the build section and thermal movement can be absorbed thus protecting the casing bodies and casing connections from failure.

The present casing connections 30 can also be used in a number of different applications such as mining or producing salt caverns or any circumstance where casing are subject to bending for any number of reasons.

In the foregoing specification, the invention has been described with a specific embodiment thereof; however, it will be evident that various modifications and changes may be made thereto without departing from the broader spirit and scope of the invention.

I claim:

1. A casing-connection for use in a downhole wellbore comprising:
   a. a first sub having a bored-through inside diameter having a nominal inside diameter similar to a nominal inside diameter of a first casing to which it is connected, and comprising
      i. a first circular radius face;
      ii. a second circular radius face; and
      iii. a cylindrical portion extending from the first circular radius face to the second circular radius face
   b. a second sub having a bored-through inside diameter having a nominal inside diameter similar to a nominal inside diameter of a second casing to which it is connected, and comprising:
      i. a third circular radius face for mating with the second circular radius face of the first sub; and
      ii. a threaded profile on at least a portion of an outside surface of the second sub; and c. an adjusting collar having an outside diameter similar to an outside diameter of the first casing or the second casing, and comprising:
  i. a fourth circular radius face for mating with the first circular radius face of the first sub;
  ii. a dust seal groove formed on an inner surface thereof, and longitudinally spaced from the fourth circular radius face;
  iii. a sealing ring fitted in the dust seal groove to seal contact between the adjusting collar and the first sub such that the dust seal groove and the sealing ring are longitudinally spaced from the first and fourth circular radius faces; and
  iv. a threaded profile on at least a portion of an inner surface of the adjusting collar for threadably connecting to the threaded profile of said second sub, wherein sealing surfaces are formed at connections between the first circular radius face and the fourth circular radius face; between the second circular radius face and the third circular radius face; and between the second sub threaded portion and the adjusting collar threaded portion, wherein the inside diameter and outside diameter respectively of the casing connection, where the casing connection connects to at least one of the first casing or the second casing, is the same as the inside diameter and outside diameter respectively of the casing to which it is connected, and wherein bendability and rotatability of the casing connection is adjustable by tightening or loosening said threaded connection between said second sub and said adjustable collar.

2. The casing-connection of claim 1, wherein the first circular radius face, the second circular radius face, the third circular radius face and the fourth circular radius face all have a radius of curvature of from 2.5 inches to 15 inches.

3. The casing-connection of claim 1, wherein the casing connection has bendability of up to 30° bend angles.

4. The casing-connection of claim 1, wherein the first sub further comprises one or more torque preventing means formed on said second circular radius face.

5. The casing-connection of claim 4, wherein the second sub comprises one or more torque preventing means formed on the third circular radius face, said torque preventing means being matable with the one or more torque preventing means of the first sub.

6. The casing-connection of claim 5, wherein the one or more torque preventing means of the first sub and the second sub are milled torque cogs along an exterior surface of the second circular radius face and the third circular radius face respectively, and wherein the torque cogs of the first sub interlock with the torque cogs of the second sub.

7. The casing-connection of claim 1, wherein the first sub further comprises a first end for mating with a first length of casing and wherein the second sub further comprises a second end for mating with a second length of casing.

8. The casing-connection of claim 7, wherein the first sub first end and the second sub second end have a finish that is selected from the group consisting from machined, welded and threaded to match an end finish of the first and second of casing.

9. The casing-connection of claim 8, wherein the first end of the first sub and the second end of the second sub are threaded.

10. The casing-connection of claim 1, wherein the threaded profile of the adjusting collar is a female threaded connection and the threaded profile of the second sub is a male threaded connection.

11. The casing-connection of claim 1, wherein the adjusting collar comprises one or more set screws to secure the adjusting collar to the second sub.

* * * * *